United States Patent
Berg et al.

(10) Patent No.: US 7,490,694 B1
(45) Date of Patent: Feb. 17, 2009

(54) STEERING CONVERSION VEHICLE

(75) Inventors: Norman O. Berg, Roseau, MN (US);
Robert C. Aronson, Roseau, MN (US);
Levi J. McCarroll, Camrose (CA);
Lance L. Anderson, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 452 days.

(21) Appl. No.: 11/197,146

(22) Filed: Aug. 4, 2005

(51) Int. Cl.
*B62D 1/02* (2006.01)

(52) U.S. Cl. .............. 180/326; 180/89.13; 180/89.12; 180/6.4; 180/234; 180/410; 280/775; 74/493; 296/190.01

(58) Field of Classification Search .............. 280/93.51, 280/774, 775; 114/55.55, 55.57; 180/190, 180/89.13, 89.12, 6.4, 234, 410; 297/195.1; 74/493; 296/190.01, 190.04, 190.05, 190.08
See application file for complete search history.

(56) References Cited

U.S. PATENT DOCUMENTS

| | | | | |
|---|---|---|---|---|
| 911,069 A * | 2/1909 | Perkins | ......................... | 114/154 |
| 2,614,438 A * | 10/1952 | Garmon | ....................... | 74/504 |
| 2,629,356 A * | 2/1953 | Whiting | ................... | 114/144 R |
| 2,839,312 A * | 6/1958 | Barenyi et al. | .............. | 280/775 |
| 3,195,913 A * | 7/1965 | Hallsworth | ................. | 280/775 |
| 4,299,407 A * | 11/1981 | Simson | ...................... | 280/775 |
| 4,531,921 A * | 7/1985 | Teraura et al. | ................ | 440/53 |
| 5,101,751 A * | 4/1992 | Kobayashi | ............. | 114/144 R |
| 5,320,059 A | 6/1994 | Ikeda | ......................... | 114/363 |
| 5,372,082 A * | 12/1994 | Hattori | ................... | 114/144 R |
| 5,372,083 A * | 12/1994 | Hattori | ....................... | 114/248 |
| 5,607,332 A * | 3/1997 | Kobayashi et al. | ............ | 440/41 |
| 6,086,142 A * | 7/2000 | Simmons et al. | ........ | 296/190.01 |
| 6,991,060 B2 * | 1/2006 | Chernoff et al. | ............ | 180/326 |
| 7,331,418 B2 * | 2/2008 | Audet | ........................ | 180/312 |
| 2003/0000449 A1 | 1/2003 | Eck | ............................. | 114/363 |
| 2003/0102694 A1 | 6/2003 | Rondeau | ................ | 296/203.04 |
| 2007/0034435 A1 * | 2/2007 | Berg et al. | .................. | 180/190 |

\* cited by examiner

*Primary Examiner*—Christopher P Ellis
*Assistant Examiner*—Jacob Meyer
(74) *Attorney, Agent, or Firm*—Baker & Daniels LLP

(57) ABSTRACT

Some embodiments of the invention include a vehicle having a chassis and an engine supported by the chassis, the engine coupled to a drive train useful for propelling the vehicle. The vehicle may include a steering indexing assembly useful for positioning a steering control between a first steering position having the steering control positioned generally along the longitudinal centerline of the vehicle and a second steering position having the steering control positioned laterally of the longitudinal centerline of the vehicle.

31 Claims, 21 Drawing Sheets

STEERING CONVERSION VEHICLE

RELATED APPLICATIONS

This application is related to U.S. patent application Ser. No. 11/197,649, titled Seat Conversion Vehicle, filed Aug. 4, 2005, the contents of which are hereby incorporated by reference.

FIELD OF THE INVENTION

Embodiments of the invention generally relate to vehicles able to convert between single rider and multiple rider configurations.

BACKGROUND OF THE INVENTION

Typically, all terrain vehicles (ATVs) are generally suitable for accommodating a single rider. ATVs that have been adapted to accommodate more than one rider generally allow for the additional rider to sit in tandem with the driver. In such arrangements, the passenger's view is obstructed by the driver. Therefore, if a consumer wants to ride with friends or family, even occasionally, the consumer must purchase two ATVs.

BRIEF SUMMARY OF THE INVENTION

Some embodiments of the invention include a steering indexing assembly useful for positioning a steering control between a first steering position having the steering control positioned generally along the longitudinal centerline of the vehicle, and a second steering position having the steering control positioned laterally of the longitudinal centerline of the vehicle. In some embodiments, the angle of the steering control is generally constant relative to a vertical plane containing the longitudinal centerline of the vehicle when the steering control is in the first steering position and the second steering position. Embodiments of the invention also include vehicles having a steering indexing assembly and convertible between first and second seating configurations, as well as methods of converting a vehicle from a generally centrally located driver configuration to a laterally located driver configuration.

DETAILED DESCRIPTION OF THE INVENTION

The following detailed description should be read with reference to the drawings, in which like elements in different drawings are numbered identically. The drawings, which are not necessarily drawn to scale, depict selected embodiments and are not intended to limit the scope of the invention. Several forms of the embodiments will be shown and described, and other forms will be apparent to those skilled in the art. It will be understood that embodiments shown in drawings and described are merely for illustrative purposes and are not intended to limit the scope of the embodiments as defined in the claims that follow.

Figure 1:
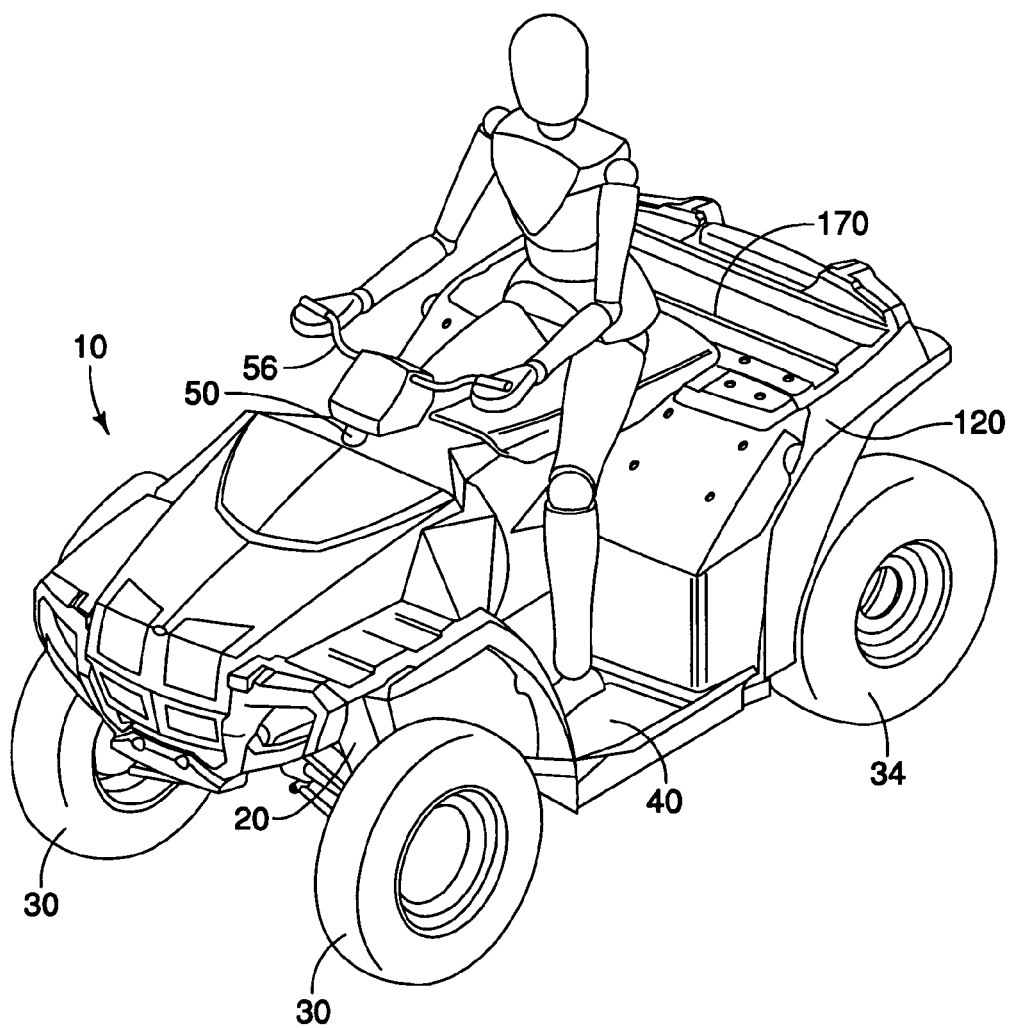
FIG. 1 shows a perspective view of a conversion vehicle in accordance with an embodiment of the invention.

A conversion vehicle 10 in accordance with an embodiment of the invention is shown in FIG. 1. Vehicle 10 includes a chassis 20, at least one ground engaging element, such as two front wheels 30 and two rear wheels 34, laterally extending footrests 40 on opposite sides of the vehicle, and an engine located generally between the footrests 40. A steering post assembly 50 is operatively connected to the pair of front wheels 30. A steering control 56 (e.g., handle bars) supported by the steering post 50 may be provided for rotating the steering post 50 to effect steering.

Figure 2:
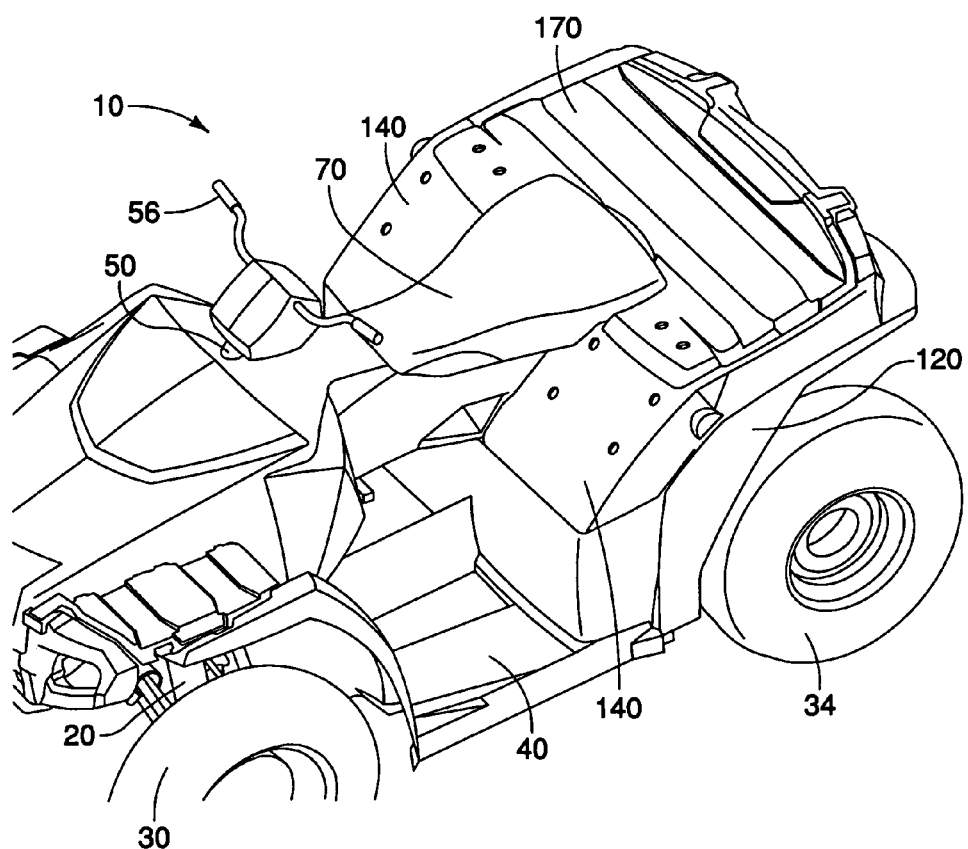
FIG. 2 shows a perspective view of a conversion vehicle in a first steering and seating configuration in accordance with an embodiment of the invention.
Figure 3:
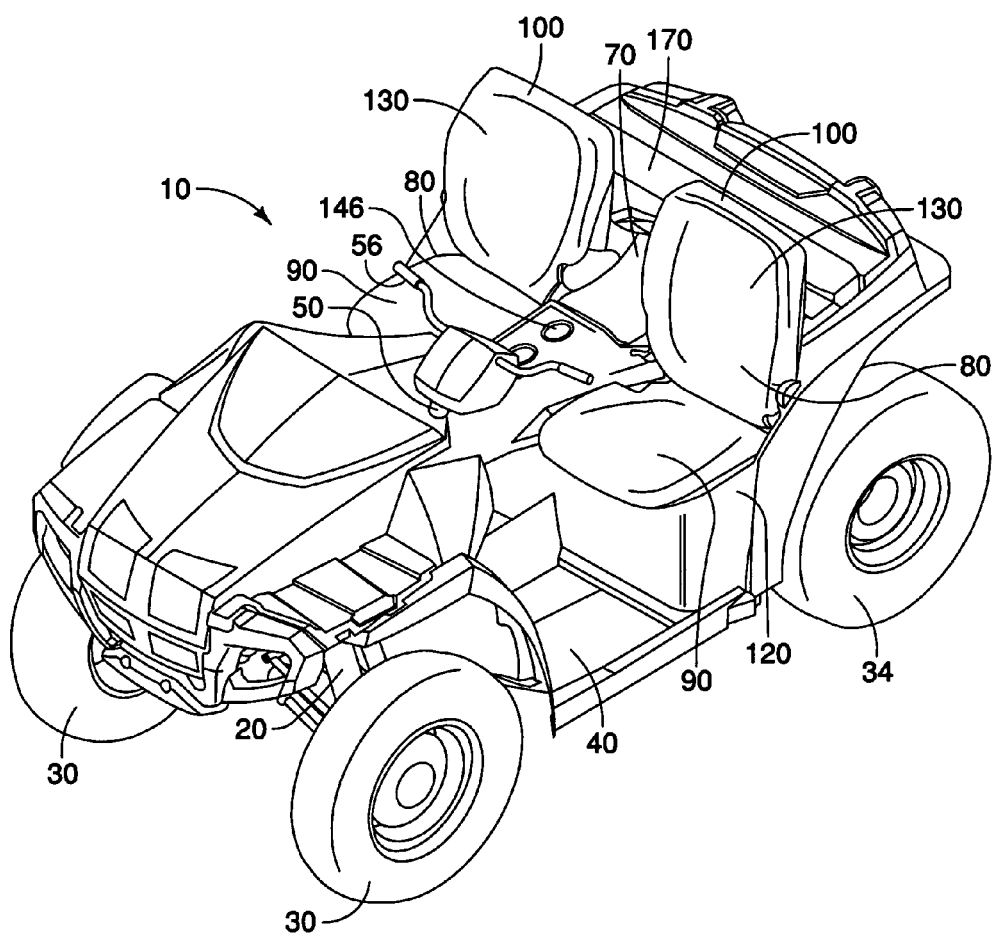
FIG. 3 shows a perspective view of a conversion vehicle in a second steering and seating configuration in accordance with an embodiment of the invention.

In some embodiments, the vehicle 10 is convertible between a first seating configuration having a first seat 70 disposed generally along the longitudinal centerline of the vehicle 10 as shown in FIG. 2, and a second seating configuration having a lateral seat 80 disposed laterally of the longitudinal centerline of the vehicle 10 as shown in FIG. 3. Such a vehicle 10 is useful for providing an ATV like riding experience for one rider, and also allowing the rider to carry a passenger when desired. In some embodiments, there are two lateral seats 80 positioned a lateral distance from the longitudinal centerline of the vehicle 10. Such embodiments are useful for accommodating a driver and a passenger in a generally side-by-side seating arrangement. In some embodiments, the vehicle 10 is longer (e.g., by about 10 inches) than a traditional ATV to accommodate the first seat 70 and the lateral seats 80.

Figure 4:
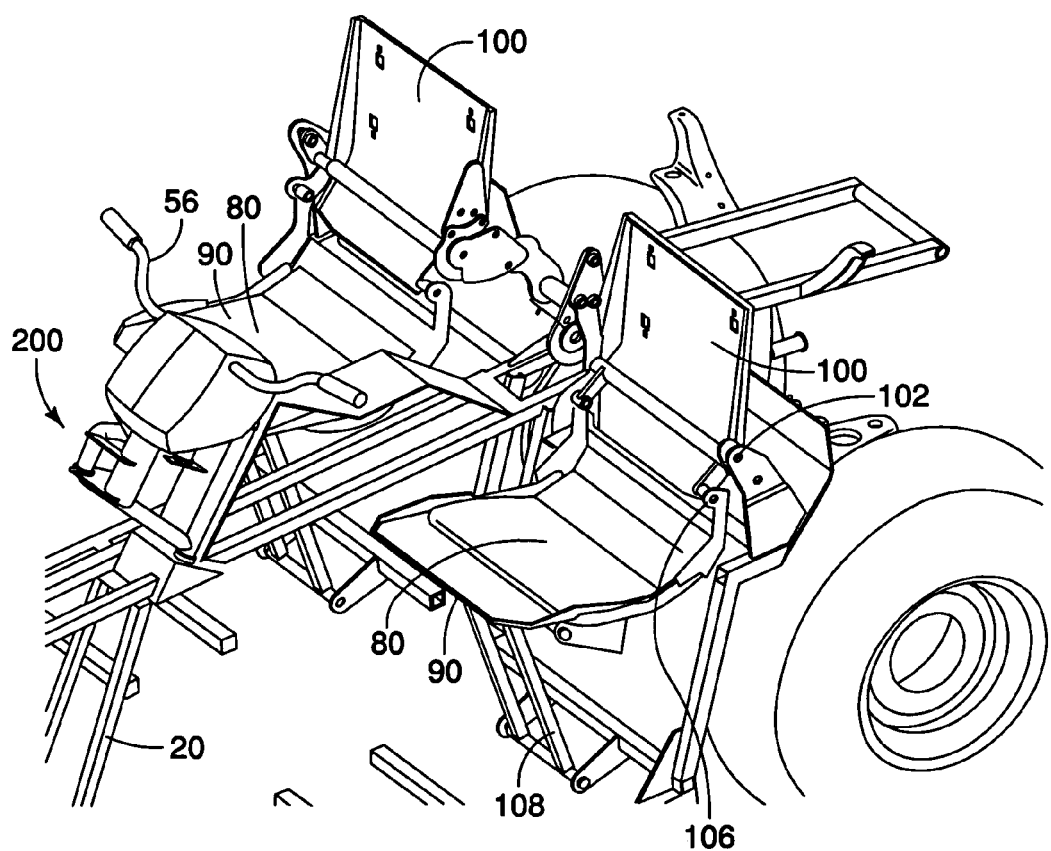
FIG. 4 shows a perspective view of a conversion vehicle in a second steering and seating configuration without body panels in accordance with an embodiment of the invention.
Figure 5:
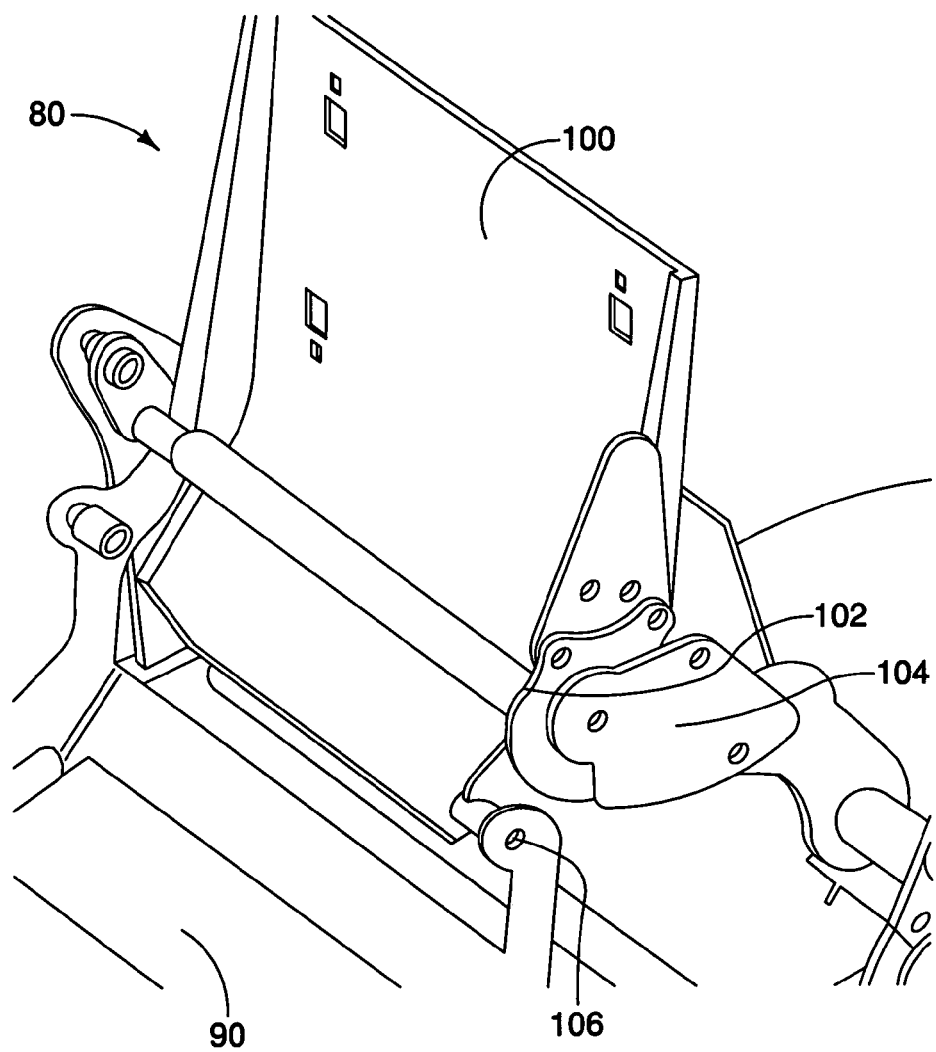
FIG. 5 shows a perspective view of a lateral seat in an open configuration in accordance with an embodiment of the invention.
Figure 6A:
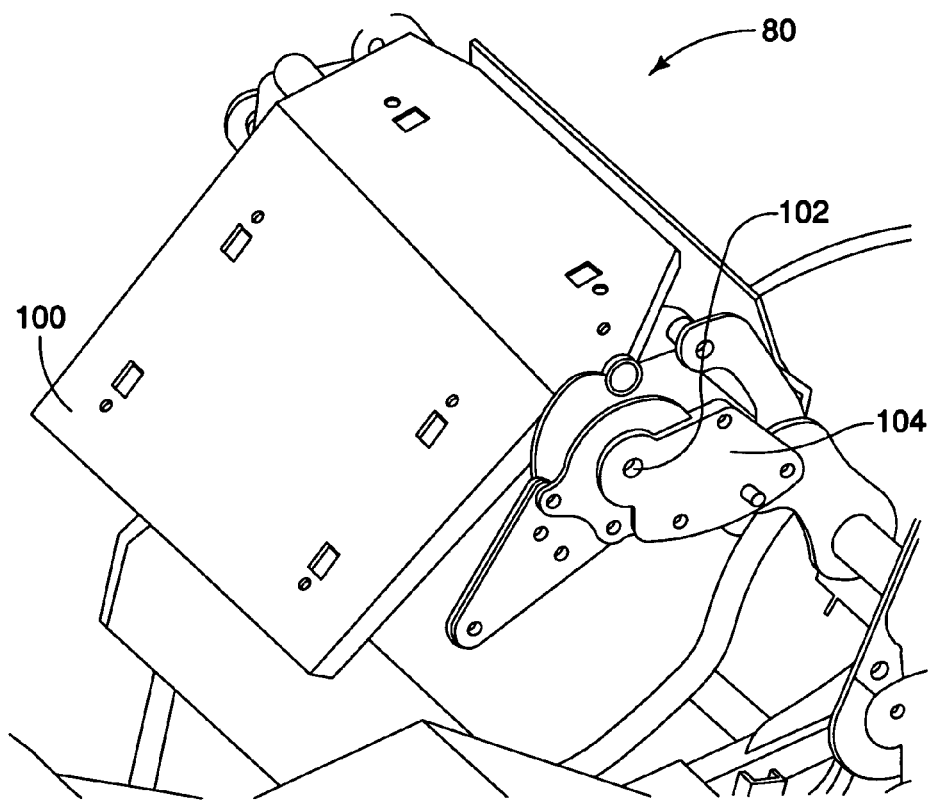
FIG. 6A shows a perspective view of a lateral seat in a closed configuration in accordance with an embodiment of the invention.
Figure 6B:
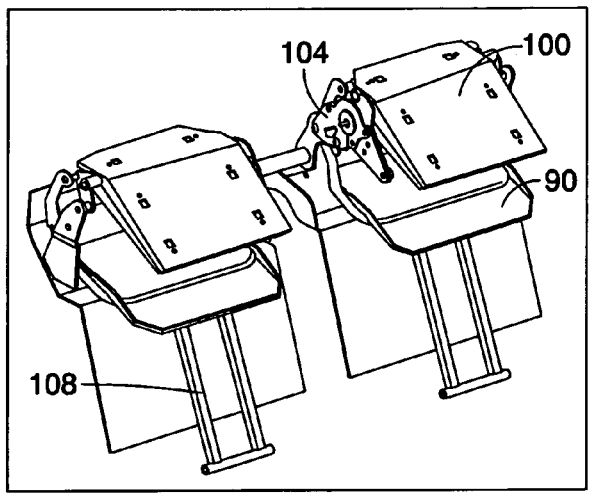
FIG. 6B shows a perspective view of a lateral seat latch mechanism and two lateral seats in a closed configuration in accordance with an embodiment of the invention.
Figure 6D:
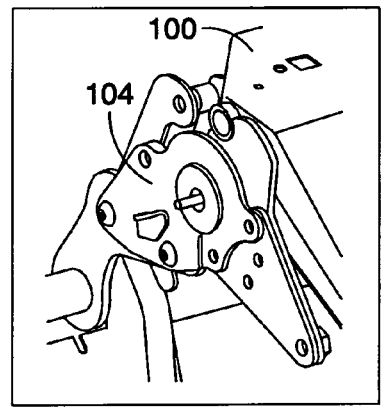
FIG. 6D shows a perspective view of a lateral seat latch mechanism and a lateral seat in a closed configuration in accordance with an embodiment of the invention.
Figure 6C:
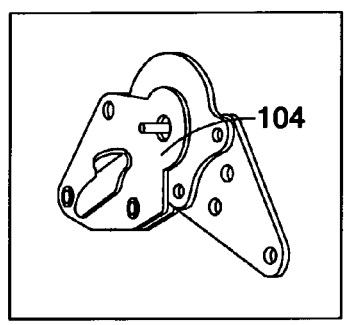
FIG. 6C shows a perspective view of a lateral seat latch mechanism in accordance with an embodiment of the invention.
Figure 6E:
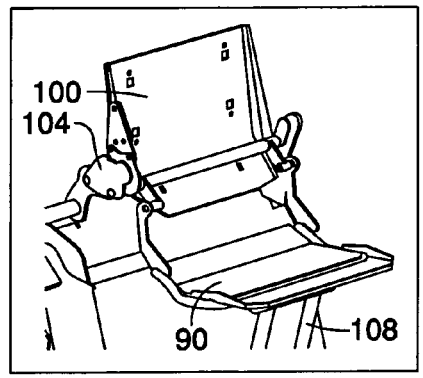
FIG. 6E shows a perspective view of a lateral seat latch mechanism and a lateral seat in an open configuration in accordance with an embodiment of the invention.

Lateral seat 80 may comprise any style useful for supporting a rider. In some embodiments, the lateral seat 80 includes a lateral seat bottom 90 and a seat back 100. The lateral seat bottom may be useful for supporting a rider's weight and the lateral seat back 100 may be useful for supporting the back of a rider. In some embodiments, the lateral seat 80 may be configurable between an open state and a closed state. The open state may be useful for accommodating a rider, while the closed state may be useful for keeping the lateral seat 80 from interfering when the vehicle 10 is configured for a single rider. For example, as shown in FIG. 4, the seat back 100 may be pivotable about a hinge 102 between an open state and a closed state. In some embodiments, as shown in FIGS. 5 and 6A-E, one or more latches 104 may be provided so the seat back 100 may be locked in the open position and/or the closed position. Any latch suitable for locking one or more of the seat backs 100 in the open and/or closed position may be provided. As shown in FIGS. 5-6A-E, a single two position type latch may be utilized for each seat back 100. The latch may be actuated by any suitable means, such as by manual manipulation (e.g., a thumb actuated release lever). In some embodiments, the latch 104 may be unlocked from its closed position and the seat back may be opened and then further adjusted for comfort. Such embodiments may include a gear with a relatively fine pitch (e.g., 1/1000) to provide the comfort adjustment. Further, the seat back 100 may be biased (e.g., by a spring) to the closed position.

Figure 7:
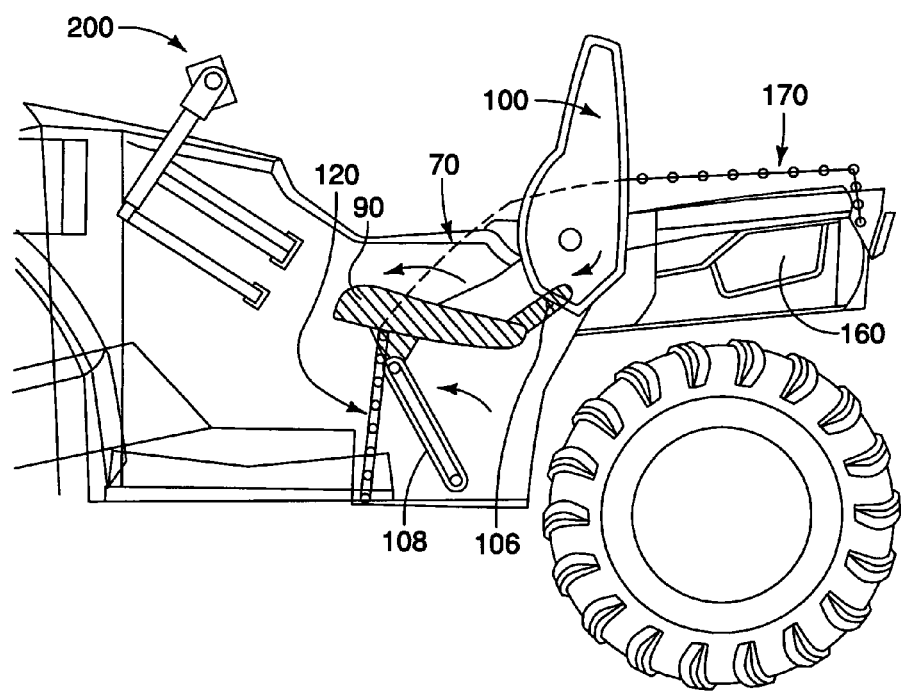
FIG. 7 shows a side plan view of a conversion vehicle in a second steering and seating configuration in accordance with an embodiment of the invention.
Figure 8:
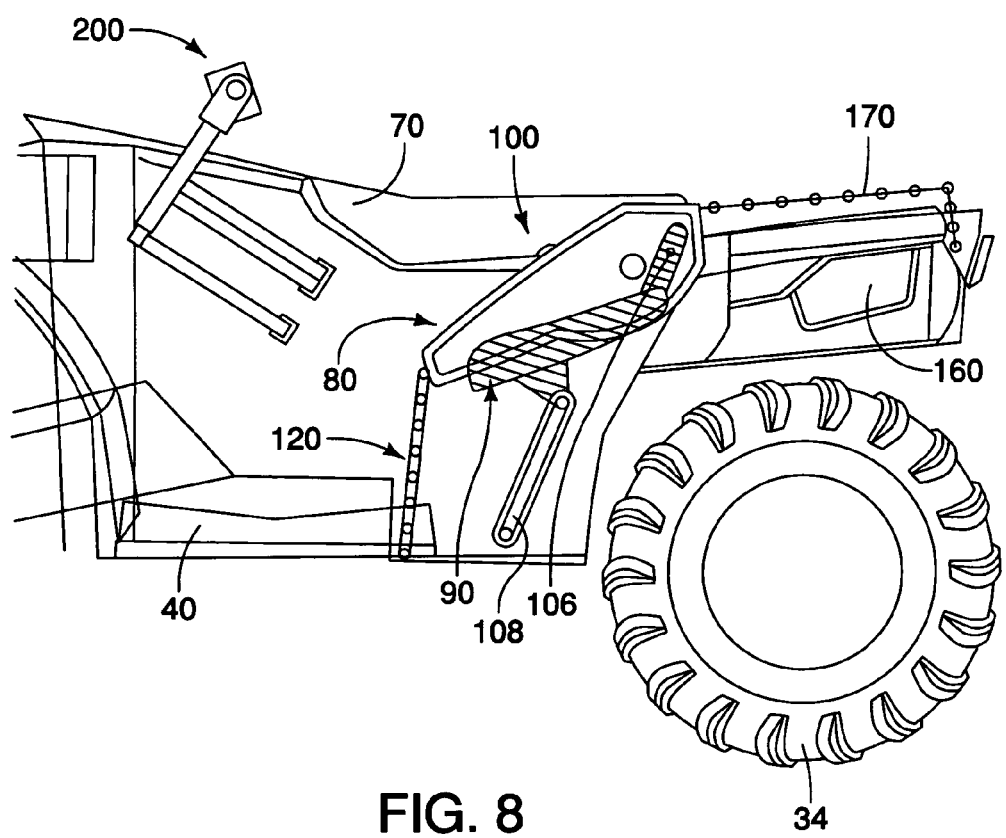
FIG. 8 shows a side plan view of a conversion vehicle in a first steering and seating configuration in accordance with an embodiment of the invention.

In some embodiments, the lateral seat bottom 90 may also be positionable to provide a desired seating arrangement. Any suitable mechanism may be provided to position the lateral seat bottom 90, such as a bottom hinge 106 about which seat bottom 90 pivots and/or tracks on which seat bottom 90 may glide. As shown best in FIGS. 4, 7 and 8, the lateral seat bottom 90 may move up and forward when the seat back 100 pivots. A lower link arm 108 may be provided to support seat bottom 90 such that when seat back 100 is pivoted backwards to open the lateral seat 80, a force is placed on seat bottom 90 to move it towards the front of the vehicle 10. As shown in FIGS. 7 and 8, the lower link arm may pivot to support the seat bottom 90 as it moves and stabilize it in its open position. In some embodiments, the lateral seat bottom 90 moves forward about 4 inches. Such embodiments is useful for allowing a rider to sit closer to the front of vehicle 10.

Lateral seat bottom 90 may also be adapted to facilitate retention of a rider on the vehicle. For example, the bottom 90 may be canted and/or sloped to retain the rider. In some embodiments, the front of seat bottom 90 is canted in towards the longitudinal centerline of the vehicle (e.g., about 5 to 10 degrees). Further, in some embodiments, the lateral edge of the seat bottom 90 is raised (e.g., about 1 inch) so that the seat bottom is sloped from the lateral edge towards the longitudinal centerline of the vehicle.

In some embodiments, the lateral seat 80 is stowable. Such embodiments may enhance visual appeal by generally removing the lateral seat 80 from sight while it is not being utilized. Lateral seat 80 may be stowable in any suitable location. In some embodiments, the lateral seat is stowable within a fender 120, as shown in FIG. 2. Such embodiments are useful for providing the vehicle 10 with a traditional ATV style look when it is configured in the single rider position, as well as providing traditional ATV footrest areas 40 for a driver in the single rider position.

Figure 9:
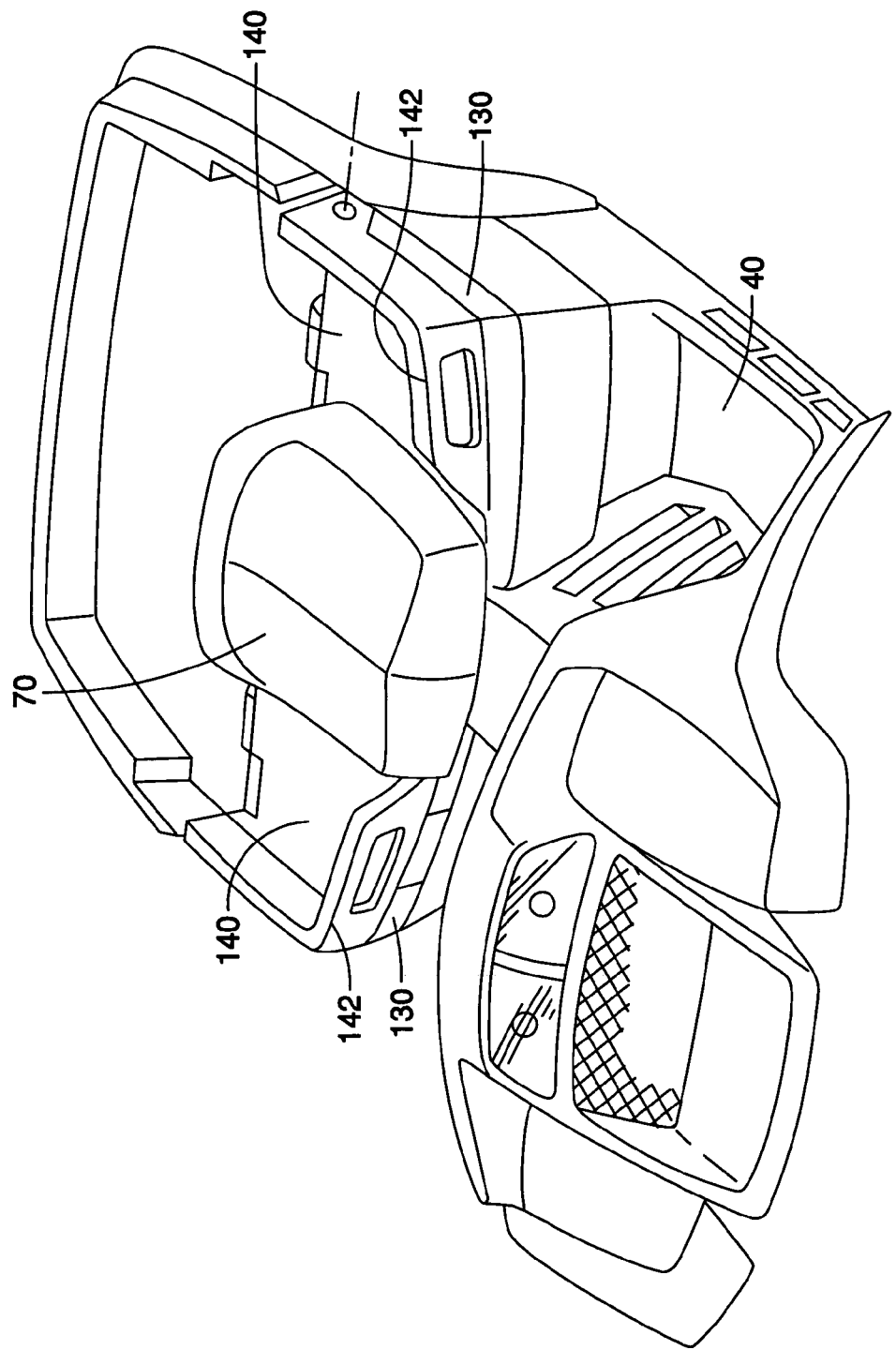
FIG. 9 shows a perspective view of a conversion vehicle in a first seating configuration in accordance with an embodiment of the invention.

Lateral seat back 100 may have a first surface 130 and a second surface 140 opposite the first surface, each surface being adapted to provide a different function. In some embodiments, the second surface 140 may comprise a fender portion as shown in FIG. 2. The fender portion may be adapted to match or blend with the other shapes or materials provided within the fender. In other embodiments, as shown in FIG. 9, the first surface 130 may be adapted to contact a rider (e.g., such as by providing a cushioned seating surface) and the second surface 140 may comprise a tray useful for holding objects when the vehicle is in the first seating configuration. In such a embodiments, a raised lip 142 may be provided to help secure items placed within the tray.

In some embodiments, the lateral seat 80 is adapted to reduce the exposure of the seat back 100 and seat bottom 90 to contaminants (e.g. dirt and mud) when the lateral seat 80 is in the closed position. For example, seat back 100 and seat bottom 90 may contain foam that at least partially compresses when the lateral seat 80 is closed to create a seal to avoid entry of contaminants. Further, such embodiments may include a perimeter curtain extending around the perimeter of the seat back 100 and/or seat bottom 90 to cover any gap between the seat back and bottom when the seat is in the closed position. In other embodiments, the perimeter of the seat back 100 and/or seat bottom 90 may be contoured such that they form a relatively tight mating surface when the lateral seat 80 is closed.

The first seat 70 may comprise any shape useful for supporting a rider. In some embodiments, first seat 70 may comprise a generally straddle type seat. Further, the first seat 70 may be displaceable (e.g., removable or repositionable from a location located generally along the longitudinal centerline of vehicle 10). In some embodiments, storage, such as one or more cup holders 146, may be provided in the exposed area vacated by first seat 70. In some embodiments, as shown in FIG. 9, first seat 70 may be displaced by pivoting rearward to convert vehicle 10 to a multi-rider seating configuration. In such embodiments, a storage compartment may be provided within the underside of first seat 70.

Figure 10:
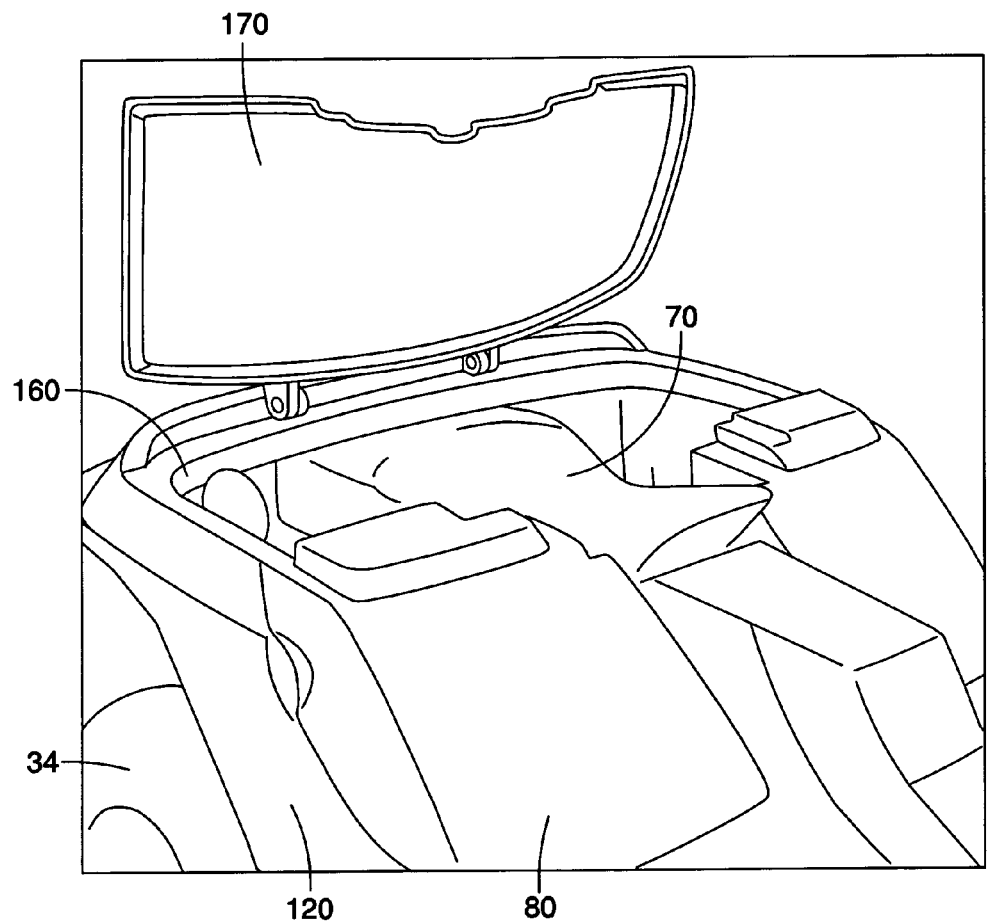
FIG. 10 shows a perspective view of a conversion vehicle having a storage compartment in accordance with an embodiment of the invention.

In some embodiments, a means to store the first seat 70 within and/or on the vehicle 10 may be provided. For example, as shown in FIG. 10, the vehicle 10 may have a rear storage compartment 160 supported by the chassis 20. The storage compartment 160 may be adapted to receive at least a portion of the first seat 70 when the vehicle is in the second seating configuration. The storage compartment 160 may have a top cover portion 170 to cover at least a portion of the first seat 70 when it is at least partially retained within the storage compartment 160.

Embodiments of the invention also include a method of converting any of the vehicles 10 discussed herein from a single rider configuration to a multiple rider configuration. In some embodiments, the method comprises the steps of displacing the first seat 70 and revealing the lateral seat 80 (e.g., by pivoting seat back 100 to the exposed position). In some embodiments, lateral seat 90 is revealed by actuating a lever and raising the seat back 100. The method may also include lifting the top cover portion 170 to access the rear storage compartment 160 and placing at least a portion of the first seat 70 within the storage compartment 170. The top cover portion 170 may then be placed in the closed position to appropriately secure the first seat 70. As discussed further below, the method may also include moving a steering control 56 between a first steering position located generally along the longitudinal centerline of the vehicle 10 and a second steering position located laterally of the longitudinal centerline of the vehicle 10.

Figure 11:
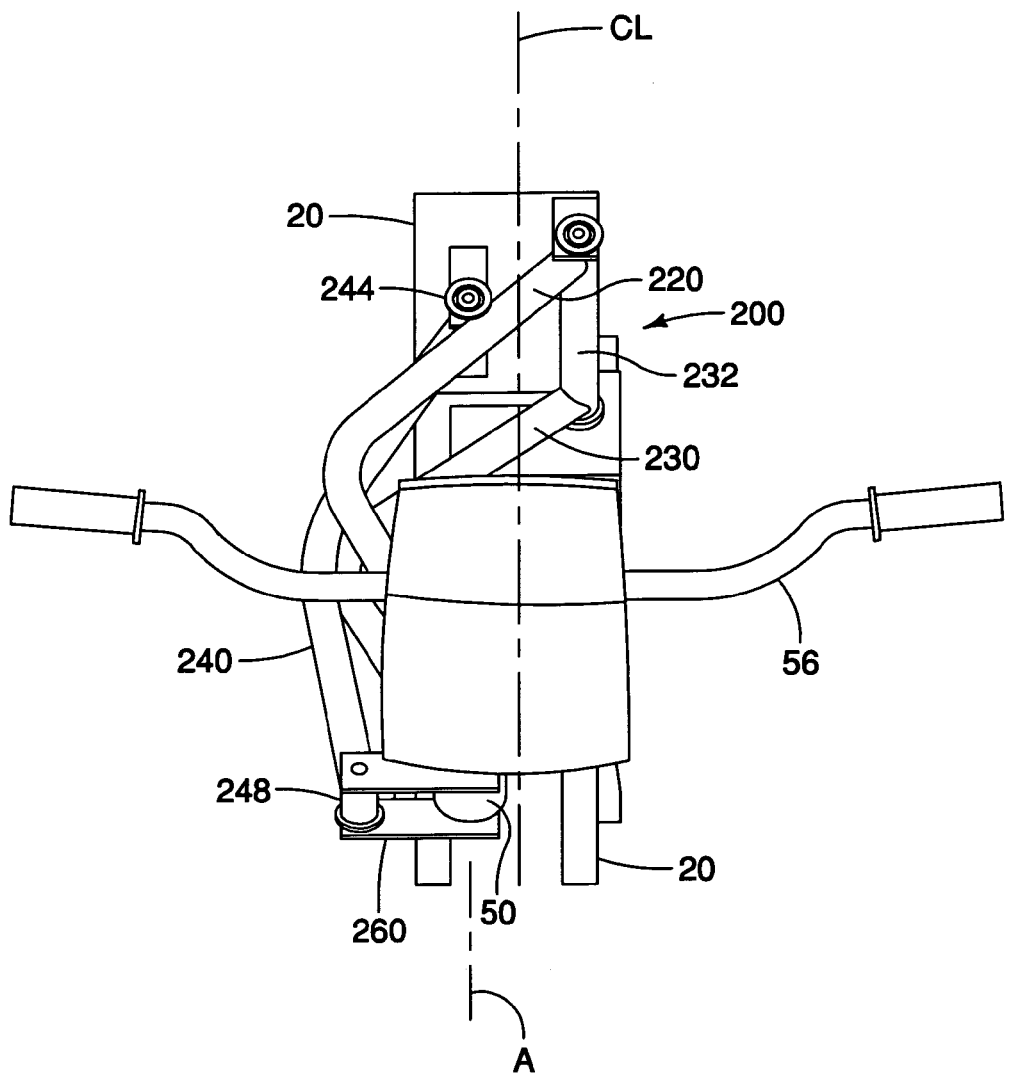
FIG. 11 shows a top perspective view of a conversion vehicle having a steering indexing assembly in a first configuration in accordance with an embodiment of the invention.

Embodiments of the invention may include a steering indexing assembly 200. Steering indexing assembly 200 may comprise any assembly useful for positioning the steering control 56 between a first steering position having the steering control 56 positioned generally along the longitudinal centerline of the vehicle 10, and a second steering position having the steering control 56 positioned laterally of the longitudinal centerline of the vehicle 10. Of course, more than two steering positions may be provided. An example of a first steering position is shown in FIG. 2 and an example of a second steering position is shown in FIG. 3, while an example of a steering indexing assembly 200 in a first steering position is shown in FIG. 11, and an example of a steering indexing assembly 200 in a second steering position is shown in FIGS. 12-14A. In some embodiments the lateral distance between the first and second steering positions is more than about 5 inches (e.g., about 10 inches). Such a steering indexing assembly 200 may be useful for providing an ATV like riding experience for one rider, and also allowing the rider to carry a passenger in a generally side-by-side configuration when desired.

Figure 12:
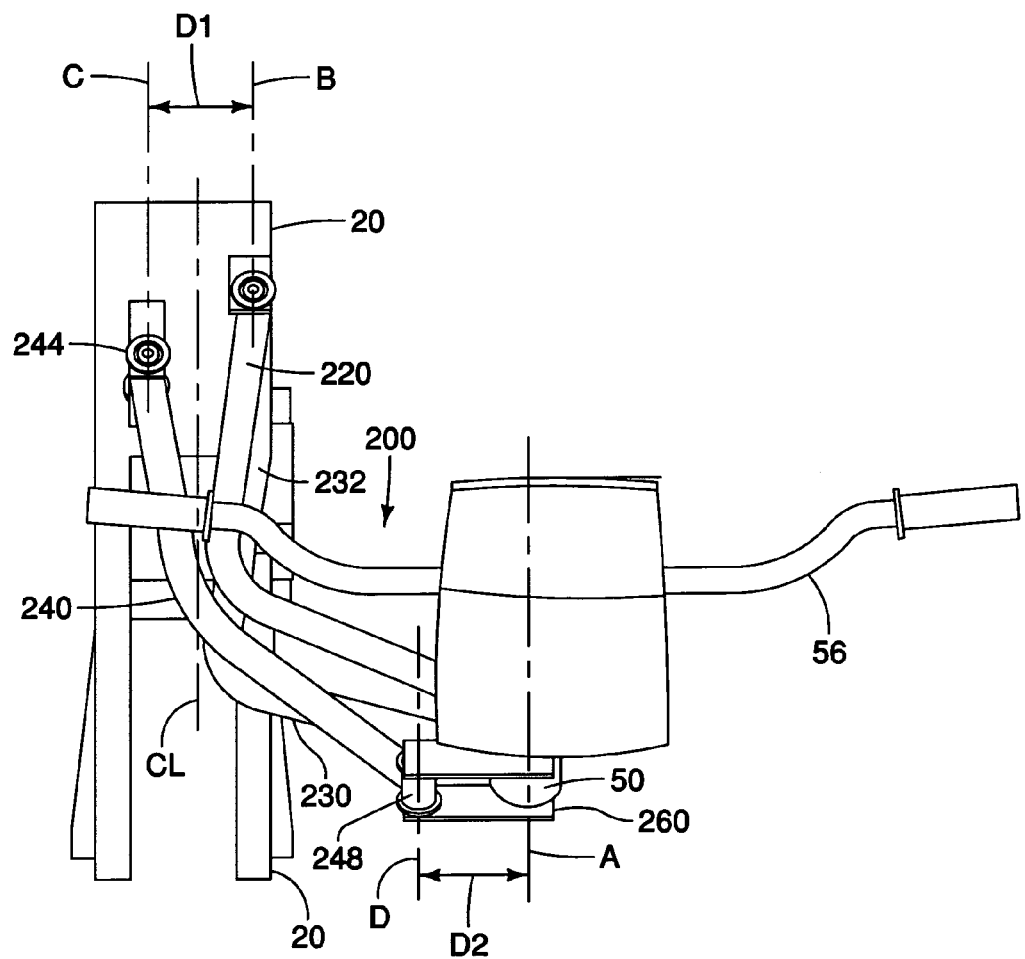
FIG. 12 shows a top perspective view of a conversion vehicle having a steering indexing assembly in a second configuration in accordance with an embodiment of the invention.
Figure 13:
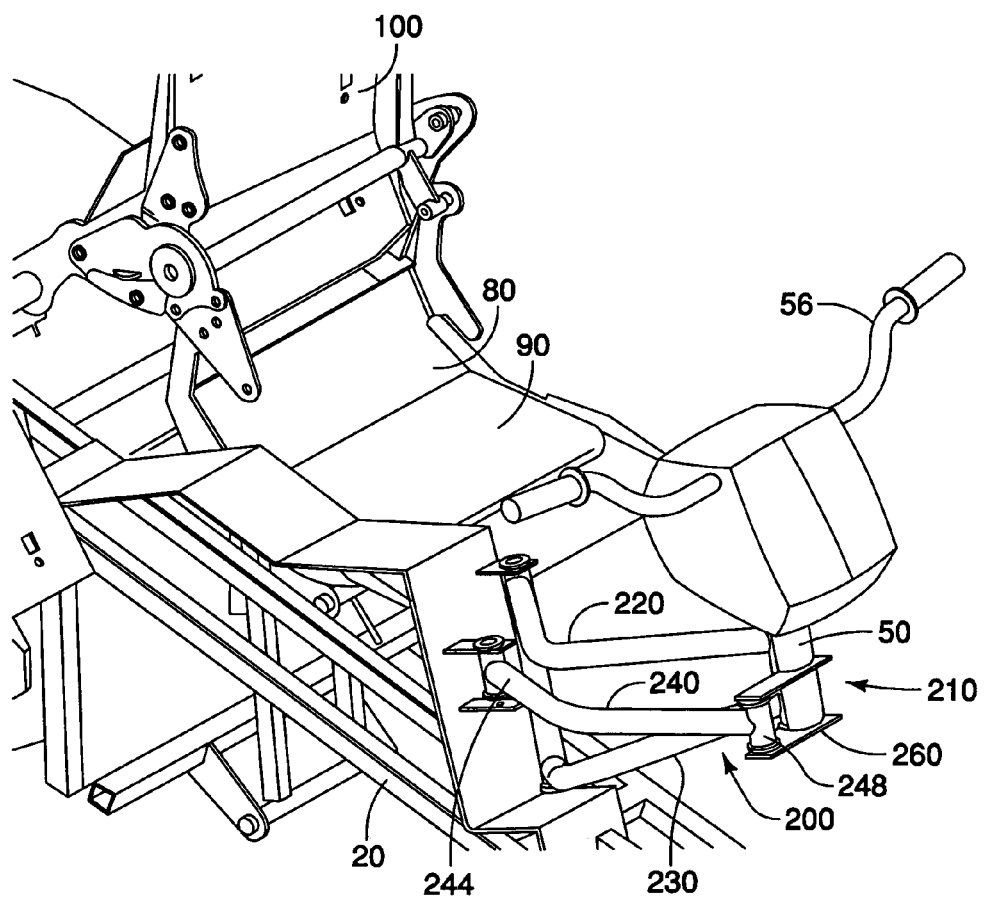
FIG. 13 shows a perspective view of a conversion vehicle having a steering indexing assembly in a second configuration in accordance with an embodiment of the invention.

In some embodiments, as shown in FIGS. 11 and 12, the angle of the axis of rotation A of the steering control 56 may be generally constant relative to a vertical plane containing the longitudinal centerline CL of the vehicle 10 when the steering control 56 is in the first steering position and the second steering position. Such embodiments are useful for not altering the axis of rotation A relative to the driver between the first and second steering positions when the driver is generally aligned with the longitudinal centerline of the vehicle 10. Further, such embodiments maintain a relatively constant angle between the driver and any accessories (e.g., gauges and/or switches) that move with the steering control 56 between the first and second steering positions. In some embodiments, the indexing assembly 200 allows the steering control 56 to move laterally and one or more of vertically and longitudinally.

As shown in FIGS. 11-14A, the indexing assembly 200 may include a linkage assembly 210. The linkage assembly may comprise a first support arm 220 that pivots about a first axis B, as shown in FIG. 12. The first support arm 220 may be functionally coupled to the chassis 20. Additional support arms, such as second support arm 230, may be provided to pivot about the first axis B to provide support to steering control 56. Further, a member 232 may be provided to link the first and second support arms. A control arm 240 with a first pivot end 244 and a second pivot end 248 may also be provided. In some embodiments, the control arm first pivot end 244 is coupled to the chassis 20 and pivotable about a second axis C spaced from the first axis B by a first distance D1. The control arm second pivot end 248 may be functionally coupled to the steering post 50, and pivot about an axis D. In some embodiments, one or more control arm brackets 260 may functionally couple the control arm second pivot end 248 to the steering post 50. In such embodiments, the steering control 56 axis of rotation A may be spaced a second distance D2 from the pivot axis D of the second pivot end 248. In some embodiments, the first distance D1 is greater than the second distance D2. Such embodiments are useful for allowing the steering control 56 to remain aligned with the driver in a variety of steering positions.

Figure 14A:
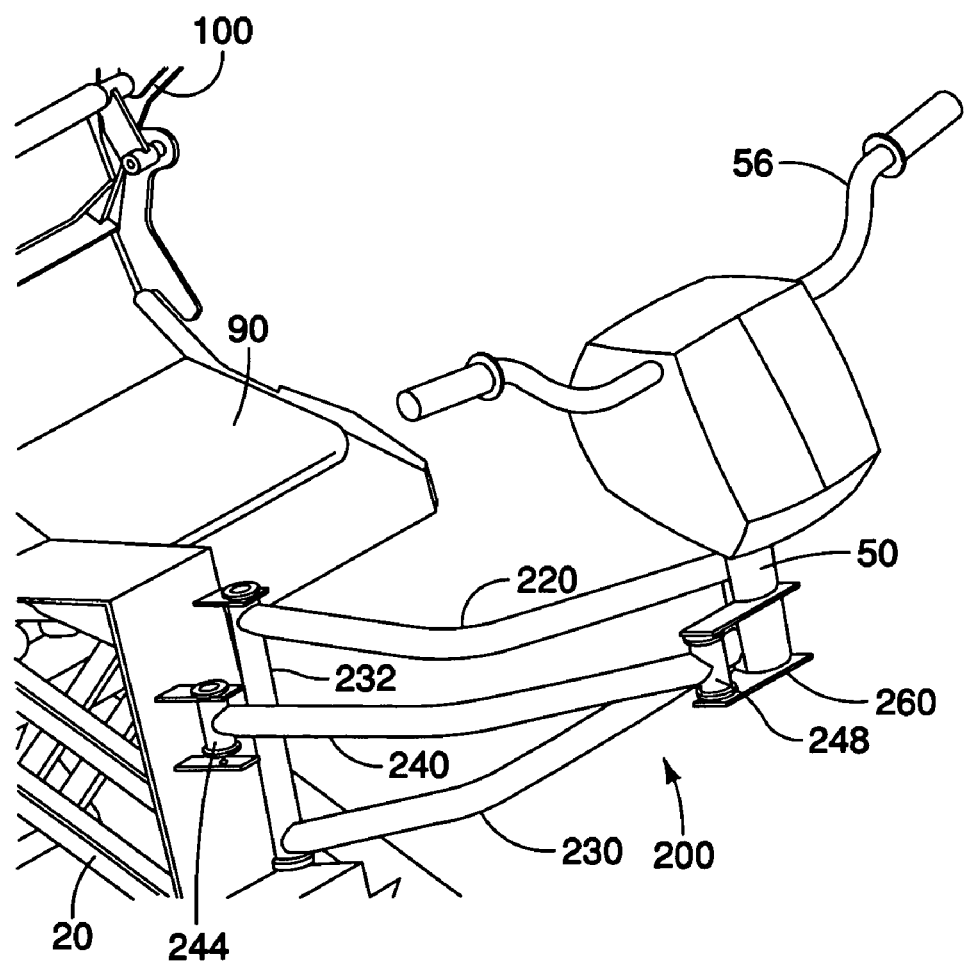
FIG. 14A shows a perspective view of a conversion vehicle having a steering indexing assembly in a second configuration in accordance with an embodiment of the invention.
Figure 14B:
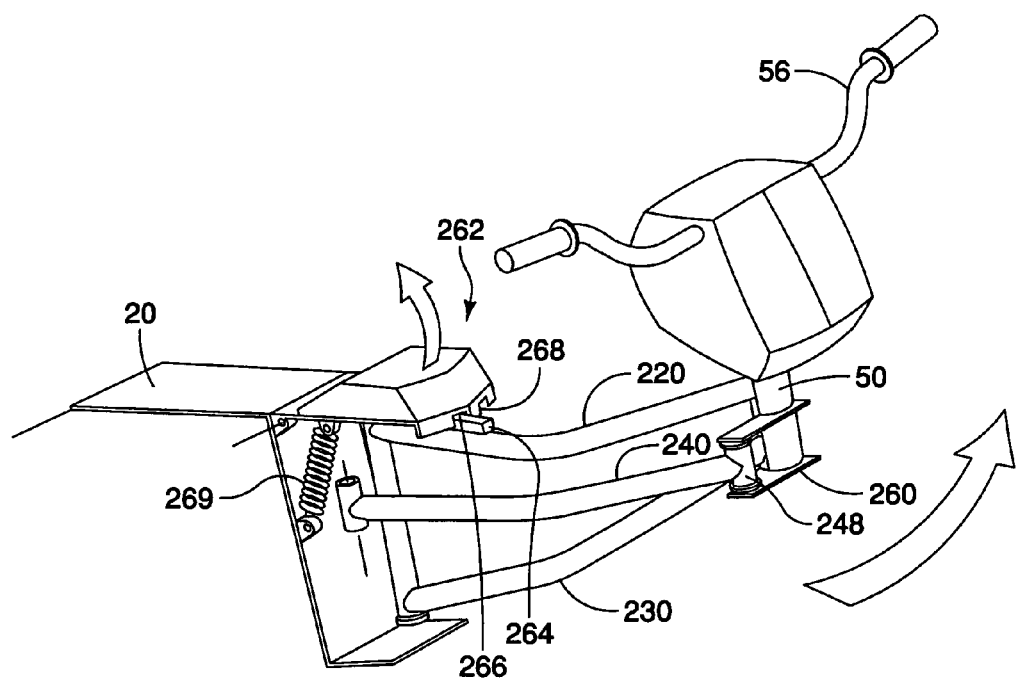
FIG. 14B shows a perspective view of a steering indexing assembly and steering latch mechanism in accordance with an embodiment of the invention.

The steering index assembly 200 may be latched by any suitable method, such as by a steering latch 262. As shown in FIG. 14B, steering latch 262 may include a lock 264 and a lift 266. Lock 264 may be coupled to a portion of the steering indexing assembly, such as to first support arm 220. Lift 266 may be coupled to the chassis 20 and have one or more notches 268 adapted to receive and engage lock 264. Further, lift 266 may be biased, such as by a spring 269, downward to engage lock 264. In such embodiments, to change the position of the steering indexing assembly a force may be applied to the lift 266 (e.g., manually) to disengage it from the lock 264. Steering indexing assembly 200 may then be placed in its desired position and the lift 266 may then be released to engage lock 264 at its nearest notch 268. As shown in FIG. 14B, the latch 262 may be positioned generally in front of the first seat 70 to provide easy access to a rider. In such embodiments, the gas tank may be placed rearward of the latch 262 to provide sufficient room for the latch location.

Figure 15:
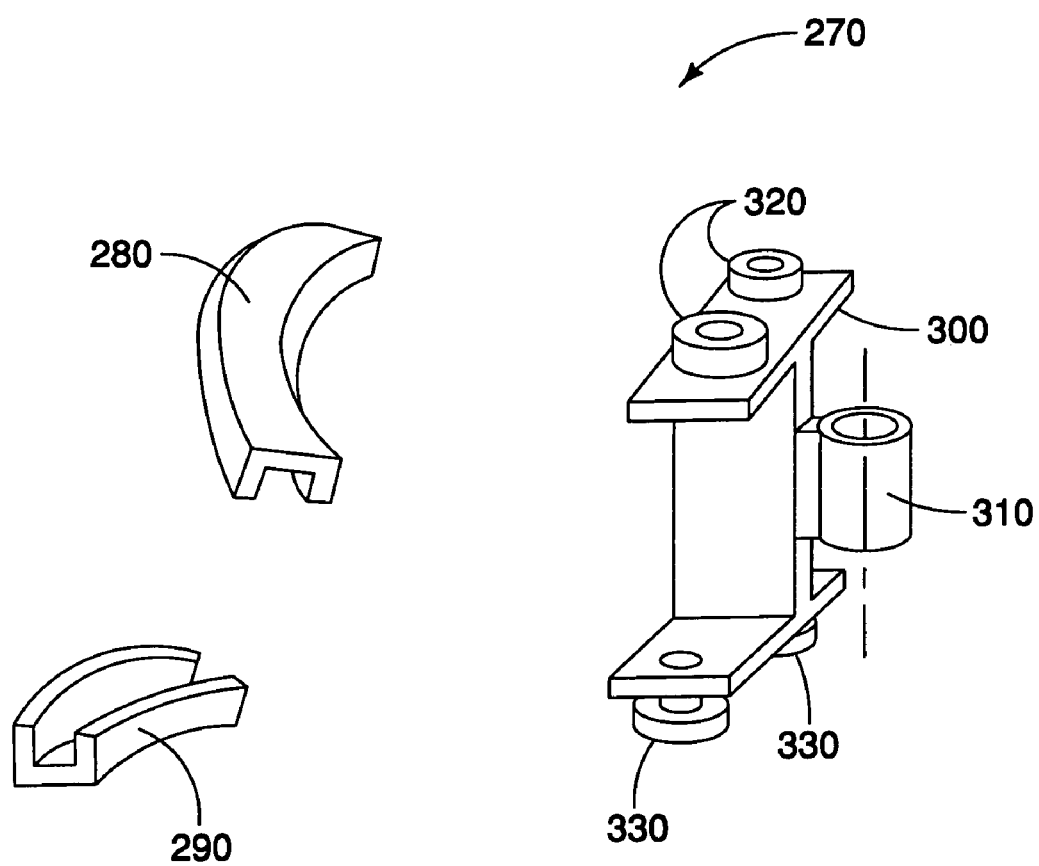
FIG. 15 shows an expanded perspective view of a guide system in accordance with an embodiment of the invention.

As shown in FIG. 15, the indexing assembly 200 may include a guide system 270. In such embodiments, the guide system 270 may be useful for adjusting the position of the steering control 56 vertically, laterally, and longitudinally. In some embodiments, the guide system 270 may include an upper track 280 and a lower track 290 that may define the path of travel of the steering control 56 during position adjustment. A guide bracket 300 may be provided to interface between a portion of the steering post 50 and the upper and lower tracks 280, 290. In some embodiments, the guide bracket 300 includes a steering post bushing 310 able to retain the steering post 50. The guide bracket 300 may also include one or more upper sliders 320 adapted to travel along upper track 280 and one or more lower sliders 330 adapted to travel along the lower track 290. Such a guide system 270 may be locked into position at any desirable location along the tracks, and released from the locked position by any suitable actuator, such as a push button actuator.

Figure 16:
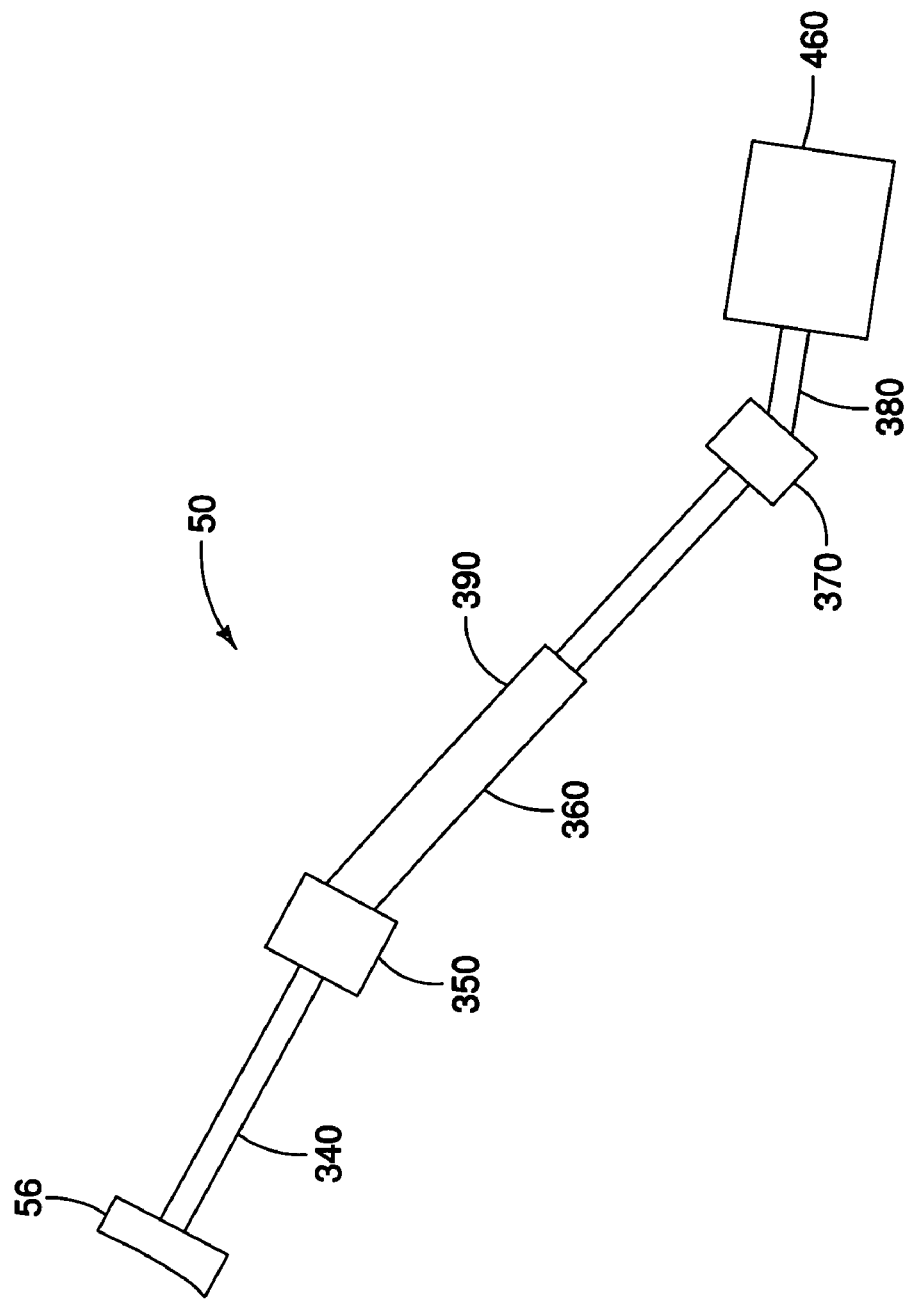
FIG. 16 shows a highly schematic side plan view of a steering post in accordance with an embodiment of the invention.

As shown in highly schematic FIG. 16, the steering control 56 may be operatively connected to a steering post 50 adapted to allow for the repositioning of the steering control 56. In some embodiments, the steering post 50 comprises a first portion 340 having a first end operatively connected to the steering control 56 and a second end operatively connected to a first joint 350. A second steering post portion 360 may have a first end operatively connected to the first joint 350 and a second end operative connected to a second joint 370. A third steering post portion 380 may be provided having a first end operatively coupled to the second joint 370 and a second end operatively coupled to the wheels 30 in a conventional fashion to effect steering of the vehicle 10. The joints may comprise any device useful for transmitting rotational force and allowing for a change in angle, such as a U-joint. Further, one or more of the steering post portions, such as the second steering post portion 360, may be adapted to change length. For example, the post portion may be providing with a sleeve 390 to accept a change in length in a telescoping type fashion. Such a steering post 50 is useful for transferring steering movement from the steering control to the wheels by accommodating changes in length and angle.

Figure 17:
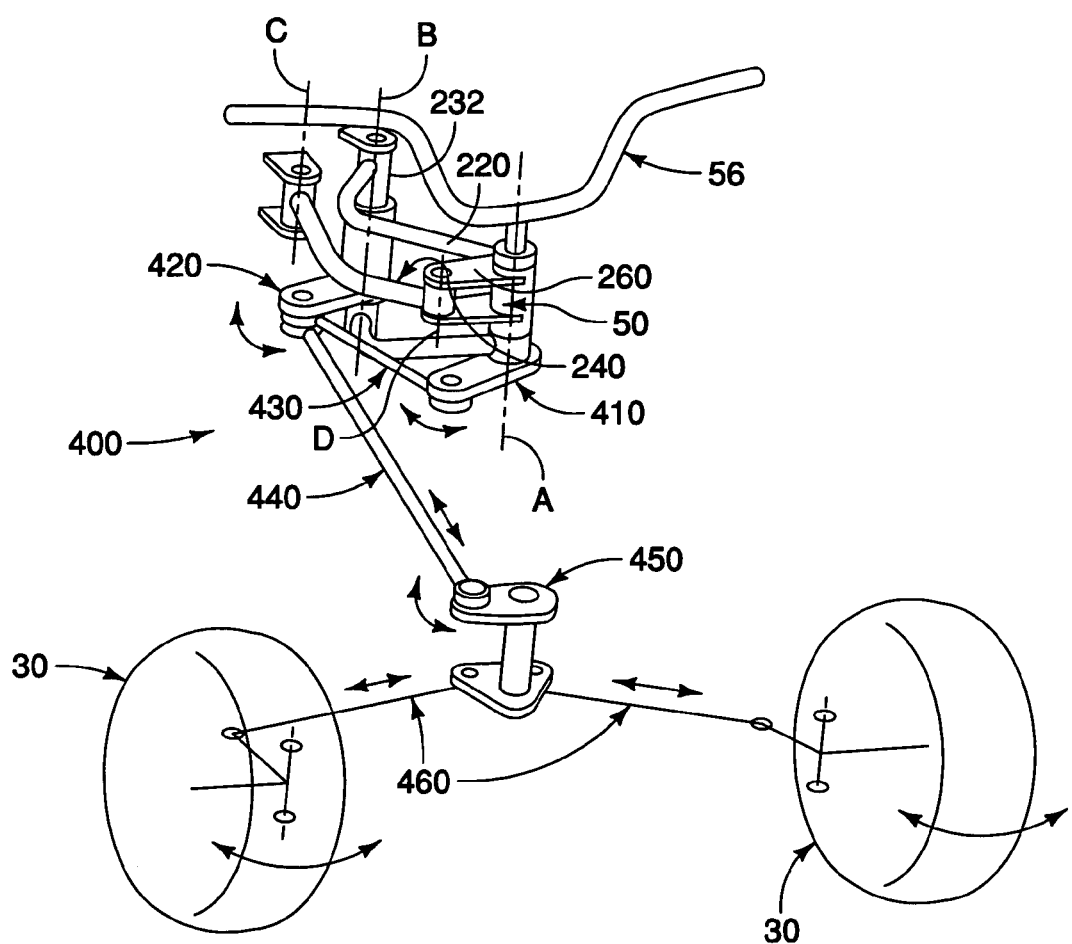
FIG. 17 shows a perspective view of a drag linkage system in accordance with an embodiment of the invention.
Figure 18:
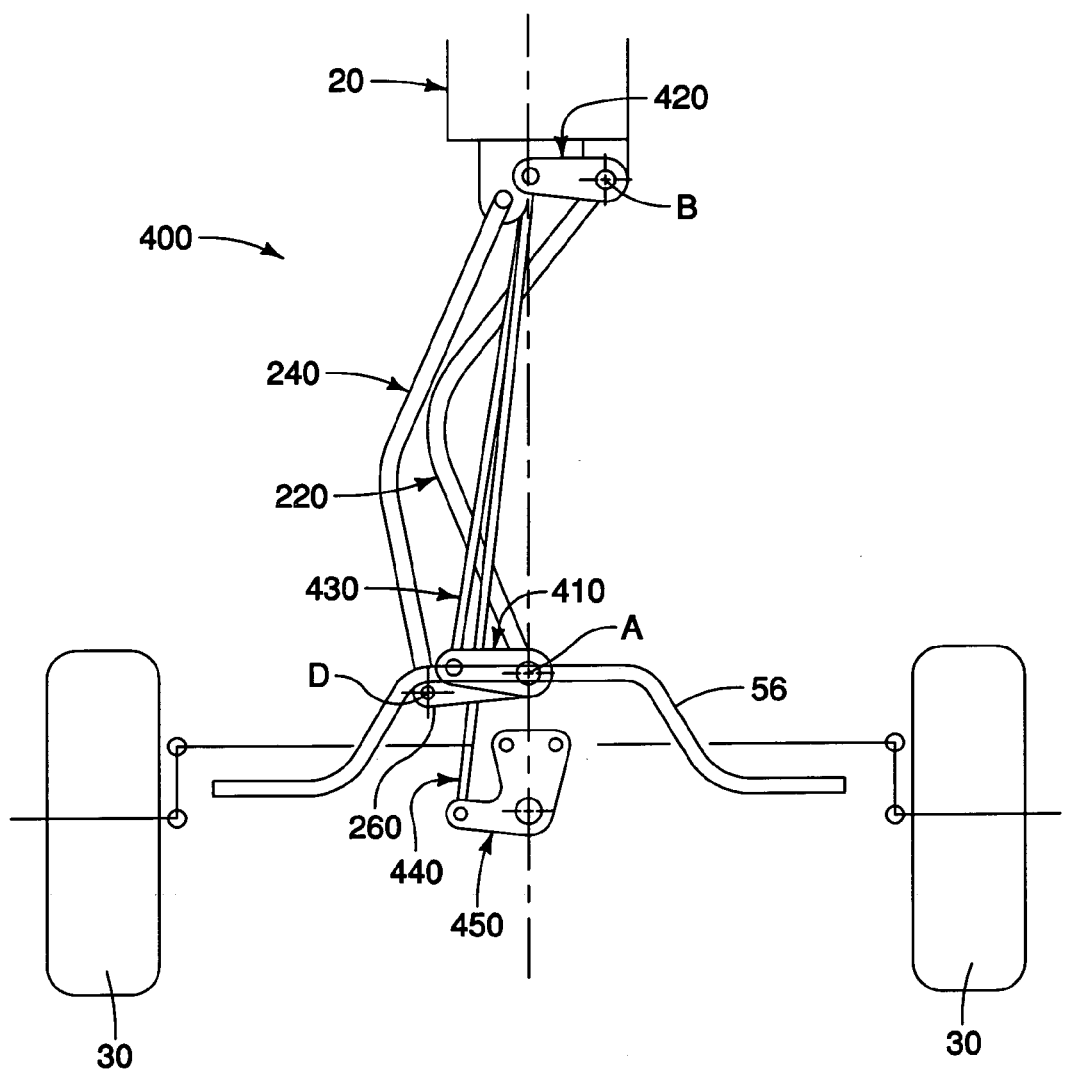
FIG. 18 shows a top plan view of a drag linkage system in a first steering configuration in accordance with an embodiment of the invention.
Figure 19:
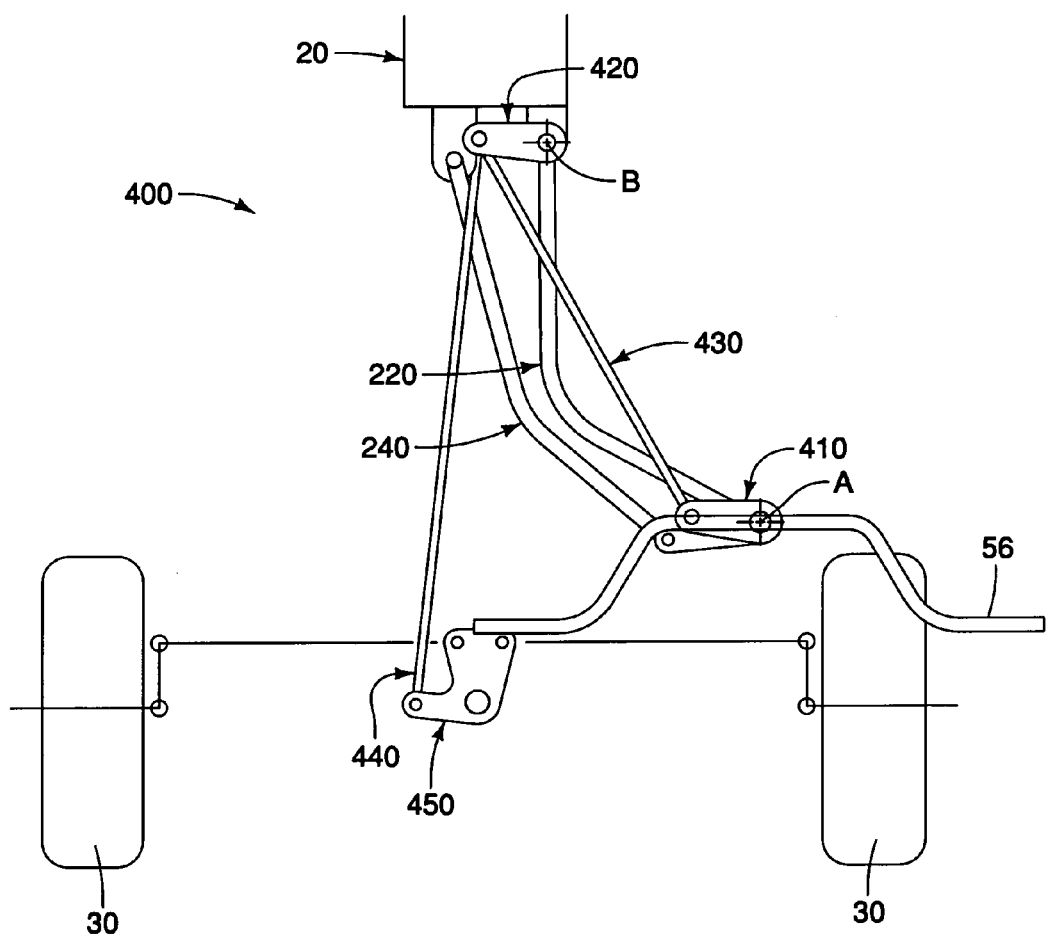
FIG. 19 shows a top plan view of a drag linkage system in a second steering configuration in accordance with an embodiment of the invention.

In other embodiments, the steering control is functionally coupled to a drag link assembly 400 to transfer steering movement from the steering control 56 to the wheels 30. As shown in FIG. 17, a portion of the steering post 50 may be functionally coupled to an upper steering arm 410. The upper steering arm 410 may be functionally coupled to an idler arm 420 through a first drag link 430. The idler arm 420 may be functionally coupled to the member 232 and a second drag link 440. The second drag link 440 may be functionally coupled to a lower steering arm 450 which transfers steering movements to the tie rods 460 and wheels 30 in a conventional fashion. Such embodiments may be useful for transferring steering movements when the steering control 56 is positioned to rotate at a location generally along the longitudinal centerline of the vehicle 10 (as shown in FIG. 18) and at positions lateral of the longitudinal centerline (as shown in FIG. 19) without changing the angle of the axis of the rotation of the steering control 56 relative to the vehicle 10.

A speed limiting mechanism may be included in some embodiments of the invention. Such a speed limiting mechanism may be useful for limiting the speed the vehicle can achieve when traveling in a multiple rider configuration. For example, the speed limiting mechanism may limit the vehicle to about 25 miles per hour or less when traveling in the multiple rider configuration. The speed limiting mechanism itself may be any mechanism useful for limiting the speed of the vehicle. For example, the speed limiting mechanism may comprise an electronic system interfaced with the vehicle's electronic control unit. Further, the speed limiting mechanism may be switched on and off by any suitable method. For example, a switch may be located to activate the speed limiting mechanism when the lateral seat back 100 is placed in the open position and/or when the steering index assembly 200 is placed in the lateral position. The switch may also deactivate the speed limiting mechanism when the seat back 100 is closed or steering assembly 200 is placed in the generally central position.

Embodiments of the invention also include a method of converting any of the vehicles described herein from a centrally located driver configuration to a laterally located driver configuration. The method may comprise the steps of moving a steering control 56 between a first steering position located generally along the longitudinal centerline of the vehicle 10 and a second steering position located laterally of the longitudinal centerline of the vehicle 10. In some embodiments, the method includes actuating a lever to release the steering control 56 so that it may be repositioned. As discussed above, the method may also comprise the step of displacing the first seat 70 disposed generally along the longitudinal centerline of the vehicle 10 and revealing a lateral seat 80 disposed laterally of the longitudinal centerline of the vehicle 10.

Thus, embodiments of the Steering Conversion Vehicle are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A vehicle comprising:
   a chassis and an engine supported by the chassis, the engine coupled to a drive train useful for propelling the vehicle; and
   a steering indexing assembly useful for positioning a steering control between a first steering position having the steering control positioned generally along the longitudinal centerline of the vehicle and a second steering position having the steering control positioned laterally of the longitudinal centerline of the vehicle, the steering indexing assembly supporting the steering control and including a linkage assembly having at least a first bent arm that couples the steering control to the chassis, the first bent arm pivotally coupled to the chassis at a first pivot point and pivotally coupled to the steering control at a second pivot point.

2. The vehicle of claim 1, further comprising a latch configured to engage the first bent arm to maintain the steering control in the first steering position and the second steering position.

3. The vehicle of claim 1, wherein the linkage assembly comprises a second bent arm pivotally coupled to the chassis at a third pivot point.

4. The vehicle of claim 3, wherein the first pivot point and the third pivot point are separated by a first lateral distance and the first bent arm is functionally coupled to a steering post and spaced therefrom by a second lateral distance, the second lateral distance being less than the first lateral distance.

5. The vehicle of claim 1, wherein the indexing assembly includes a guide system.

6. The vehicle of claim 5, wherein the guide system includes an upper track and a lower track.

7. The vehicle of claim 1, wherein the indexing assembly allows the steering control to move laterally and one or more of vertically and longitudinally.

8. The vehicle of claim 1, wherein the steering control is coupled to a steering post having more than one joint and a sleeve configured to adjust a length of the steering post.

9. The vehicle of claim 1, wherein the vehicle includes a plurality of wheels configured to propel the vehicle and the steering control is coupled to a drag link assembly that transfers movement of the steering control to the plurality of wheels.

10. The vehicle of claim 1, wherein the angle of the axis of rotation of the steering control is generally constant relative to a vertical plane containing the longitudinal centerline of the vehicle when the steering control is in the first steering position and the second steering position.

11. A vehicle comprising:
    a chassis and an engine supported by the chassis, the engine coupled to a drive train useful for propelling the vehicle;
    a steering indexing assembly useful for positioning a steering control between a first steering position and a second steering position having the steering control positioned laterally of the first steering position, the steering indexing assembly being coupled to the chassis at a location rearward of the steering control;
    a first seating configuration having a first seat disposed directly behind the steering control in the first steering position; and
    a second seating configuration having a second seat disposed laterally of the first seat and directly behind the steering control in the second steering position.

12. The vehicle of claim 11, wherein the indexing assembly includes a linkage assembly having at least a first bent arm that couples the steering control to the chassis, the first bent arm pivotally coupled to the chassis at a first pivot point and pivotally coupled to the steering control at a second pivot point.

13. The vehicle of claim 12, wherein the linkage assembly comprises a second bent arm pivotally coupled to the chassis at a third pivot point.

14. The vehicle of claim 13, wherein the first pivot point and the third pivot point are separated by a first lateral distance and the first bent arm is functionally coupled to a steering post and spaced therefrom by a second lateral distance, the second lateral distance being less than the first lateral distance.

15. The vehicle of claim 11, wherein the indexing assembly includes a guide system.

16. The vehicle of claim 15, wherein the guide system includes an upper track and a lower track.

17. The vehicle of claim 11, wherein the indexing assembly allows the steering control to move laterally and one or more of vertically and longitudinally.

18. The vehicle of claim 11, wherein the steering control is coupled to a steering post having more than one joint and a sleeve configured to adjust a length of the steering post.

19. The vehicle of claim 11, wherein the vehicle includes a plurality of wheels configured to propel the vehicle and the steering control is coupled to a drag link assembly that transfers movement of the steering control to the plurality of wheels.

20. The vehicle of claim 11, wherein the steering control has an axis of rotation that extends substantially over a centerline of the first seat when the steering control is in the first steering position and extends over a centerline of the second seat when the steering control is in the second steering position.

21. The vehicle of claim 11, wherein the steering control is positioned generally along the centerline of the vehicle when in the first steering position, the first seat includes a seat bottom having a support surface positioned generally at a first seating elevation, and the second seat includes a seat bottom having a support surface positioned generally at a second seating elevation that is lower than the first seating elevation.

22. The vehicle of claim 21, wherein the steering control has a first steering elevation when in the first steering position and a second steering elevation when in the second steering position that is lower than the first steering elevation.

23. The vehicle of claim 22, wherein the second seating configuration has a third seat, wherein the first seat of the first seating configuration is positioned laterally between the second and third seats of the second seating configuration.

24. The vehicle of claim 11, wherein the first seat is a straddle-type seat and the second seat is a bucket-type seat.

25. The vehicle of claim 1, wherein the first pivot point and the second pivot point cooperate to define an axis, at least a middle portion of the first bent arm being offset from the axis to define a space between the middle portion of the first bent arm and the axis.

26. The vehicle of claim 11, wherein the location in which the steering indexing assembly is coupled to the chassis is forward of the first seat.

27. A vehicle comprising:
a chassis;
an engine supported by the chassis;
a drive train coupled to the engine to propel the vehicle;
a steering control;
a steering indexing assembly supporting the steering control in a first steering position having the steering control positioned generally along a longitudinal centerline of the vehicle and in a second steering position having the steering control positioned laterally of the longitudinal centerline of the vehicle, the steering indexing assembly including at least first and second arms pivotally coupled to the chassis, the first arm pivotable about a first pivot axis relative to the chassis and the second arm pivotable about a second pivot axis relative to the chassis, the first pivot axis being forward of the second pivot axis being separated by a longitudinal distance.

28. The vehicle of claim 27, wherein the first arm and the second arm are bent.

29. The vehicle of claim 27, wherein the first pivot axis and the second pivot axis are separated by a lateral distance.

30. The vehicle of claim 27, wherein the first arm and the second arm are separated by a vertical distance.

31. The vehicle of claim 27, further comprising a third arm coupled to the second arm and pivotable about the second pivot axis relative to the chassis.

* * * * *